(12) United States Patent
Chen et al.

(10) Patent No.: US 8,909,903 B1
(45) Date of Patent: Dec. 9, 2014

(54) PROVIDING DATA TO REGISTERS BETWEEN EXECUTION STAGES

(75) Inventors: Hong-Yi Chen, Fremont, CA (US); Jensen Tjeng, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 201 days.

(21) Appl. No.: 13/311,184

(22) Filed: Dec. 5, 2011

Related U.S. Application Data

(63) Continuation of application No. 11/070,780, filed on Mar. 1, 2005, now Pat. No. 8,074,056.

(60) Provisional application No. 60/649,654, filed on Feb. 2, 2005.

(51) Int. Cl.
*G06F 9/30* (2006.01)

(52) U.S. Cl.
USPC .......................................................... 712/220

(58) Field of Classification Search
USPC .................................................. 712/214, 220
See application file for complete search history.

(56) References Cited

U.S. PATENT DOCUMENTS

| | | | |
|---|---|---|---|
| 5,148,546 A | | 9/1992 | Blodgett |
| 5,619,664 A | * | 4/1997 | Glew ............................ 712/218 |
| 5,742,780 A | | 4/1998 | Caulk, Jr. |
| 5,768,553 A | * | 6/1998 | Tran ............................. 712/208 |
| 5,941,984 A | | 8/1999 | Mohri et al. |
| 6,011,666 A | | 1/2000 | Wakamatsu |
| 6,061,306 A | | 5/2000 | Buchheim |
| 6,119,091 A | | 9/2000 | Huang et al. |
| 6,496,692 B1 | | 12/2002 | Shanahan |
| 6,618,812 B2 | | 9/2003 | Seiler et al. |
| 6,832,117 B1 | | 12/2004 | Miyamori |
| 6,859,873 B2 | * | 2/2005 | Norden et al. ................ 712/220 |
| 6,932,117 B2 | | 8/2005 | Wensel et al. |
| 6,954,865 B2 | | 10/2005 | Kalambur et al. |
| 7,117,344 B1 | * | 10/2006 | Ohwada ........................ 712/218 |

FOREIGN PATENT DOCUMENTS

| | | |
|---|---|---|
| EP | 0982732 | 3/2000 |
| EP | 0999549 | 5/2000 |
| WO | WO 99/48296 | 9/1999 |

OTHER PUBLICATIONS

Settles, Curtis, DSP-Augmented CPU-Cores Promise Perfonnance Boost for Ultra-Compact Drives, Data Storage, May 2000,00.35-38 PennWell, US.
Quantum, Part 2: A Closer Look at Hard Disk Drives; Chapter 3—Inside Hard Disk Drives, Quantum Online, Jun. 7, 2000, pp. 1-3, Quantum, US.
Quantum, Part 4: Recent Technological Developments; Chapter 4—The Impact of Leading-Edge Technology on Mass Storage, Ouantum Online, Jun. 7, 2000, 00. 1-3, Quantum, US.
"Advanced Computer Architecture: A Design Space Approach"; Sima et al.; Addison-Wesley; 1997.

* cited by examiner

*Primary Examiner* — Andrew Caldwell
*Assistant Examiner* — Benjamin Geib

(57) ABSTRACT

In some implementations, a processor is provided having a buffer to store one or more instructions, a decoder configured to decode the one or more instructions and generate one or more decoded instructions, a processor register file to store one or more operands, and a plurality of execution units. Each execution unit includes a plurality of execution stages and a plurality of registers. The plurality of execution stages is configured to execute one or more decoded instructions using the one or more operands. The plurality of registers is positioned between the plurality of execution stages to latch data between the plurality of execution stages.

28 Claims, 4 Drawing Sheets

# PROVIDING DATA TO REGISTERS BETWEEN EXECUTION STAGES

CROSS-REFERENCE TO RELATED APPLICATIONS

The present disclosure is a continuation of U.S. application Ser. No. 11/070,780, filed on Mar. 1, 2005, which claims priority under 35 U.S.C. §119(e) to U.S. Provisional Application No. 60/649,654, filed on Feb. 2, 2005, the contents of which are both incorporated herein by reference in its entirety.

BACKGROUND

The following disclosure relates to processing circuits and systems.

In a conventional pipeline processor, instruction execution is generally broken down into a series of discrete pipeline stages that can be completed in sequence by specialized hardware. For example, two types of instructions typically executed by a pipeline processor include load instructions and store instructions. Conventional pipeline processors generally include separate, dedicated pipeline stages to respectively handle load instructions and store instructions.

Further, in a conventional pipeline processor, a base architecture of the pipeline processor typically requires extensive redesign to accommodate additional instruction execution units or extended instruction sets, e.g., customer-specific instruction execution units or instruction sets. Additionally, conventional pipeline processors typically have a high power consumption due to, inter alia, an inability to precisely control portions of the pipeline as required.

SUMMARY

In general, in one aspect, this specification describes a processor that includes a buffer operable to store an instruction, a decoder responsive to the instruction stored in the buffer, and issue logic responsive to the decoder. The processor further includes a first execution unit including a first input register operable to receive data for execution of a decoded instruction, and a second execution unit including a second input register operable to separately receive data with respect to the first input register for execution of a decoded instruction.

Particular implementations can include one or more of the following features. Only latches within the first execution unit can toggle if data is received by the first input register and not the second input register. Also, only latches within the second execution unit can toggle if data is received by the second input register and not the first input register. The processor can further include a co-processor pipeline, in which the decoder can recognize an instruction to be processed by the co-processor pipeline and pass the recognized instruction to the co-processor pipeline for decoding and execution. The co-processor pipeline can include a second decoder responsive to the recognized instruction passed from the decoder, and an execution unit responsive to a decoded instruction from the second decoder. At least one of the first execution unit or the second execution unit can be a composite load/store execution unit operable to execute decoded load instructions and decoded store instructions in addition to or in lieu of decoded arithmetic logic unit (ALU) instructions or decoded shift instructions.

In general, in another aspect, this specification describes a processor that includes a buffer operable to store an instruction, a decoder responsive to the instruction stored in the buffer, and issue logic responsive to the decoder. The processor further includes a load/store execution pipeline including a load/store execution unit and a functional unit.

Particular implementations can include one or more of the following features. The functional unit can be one of an arithmetic logic unit (ALU), a shifter, or a multiply and accumulate (MAC) unit. The processor can further include a co-processor pipeline, in which the decoder can recognize an instruction to be processed by the co-processor pipeline and pass the recognized instruction to the co-processor pipeline for decoding and execution.

In general, in another aspect, this specification describes a pipeline processor architecture having a base architecture that includes one or more decoders operable to decode program instructions and generate one or more decoded instructions, and one or more execution units operable to execute the one or more decoded instructions. Each execution unit includes one or more execution pipeline stages. The pipeline processor architecture further includes one or more additional co-processor pipelines. The one or more decoders of the base architecture are operable to recognize one or more instructions to be processed by a given co-processor pipeline and pass the one or more recognized instructions to the given co-processor pipeline for decoding and execution.

Particular implementations can include one or more of the following features. The one or more additional co-processor pipelines can include one or more second decoders operable to decode the one or more recognized instructions passed from the base architecture and generate one or more second decoded instructions, and one or more second execution units operable to execute the one or more second decoded instructions. At least one of the one or more execution units associated with the base architecture can include one register before and after each execution pipeline stage. Each register can separately receive data for a given execution stage without regard to whether data was received by other ones of the registers.

In general, in another aspect, this specification describes a method of operation for a processor. The method includes storing program instructions during an instruction fetch stage associated with the processor, decoding the program instructions and generating corresponding decoded instructions during a decode stage associated with the processor, and issuing the decoded instructions for execution based on one or more predetermined criterion. The decoded instructions are issued during an instruction issue stage associated with the processor. The method further includes executing a given issued decoded instruction within a given execution pipeline during an execution stage associated with the processor, including, not updating data within an execution pipeline not being used in a given instruction cycle.

Particular implementations can include one or more of the following features. Issuing the decoded instructions can include bypassing one or more execution pipeline stages within a pipeline. Issuing the decoded instructions for execution based on one or more predetermined criterion can include issuing one or more of the decoded instructions based on an availability of one or more of the plurality of execution units.

In general, in another aspect, this specification describes a method of operation for a processor that includes storing a program instruction; decoding the program instruction and generating a decoded instruction; issuing the decoded instruction to a load/store execution pipeline of the processor; and executing within the load/store execution pipeline one of a decoded load instruction or a decoded store instruction in addition to or in lieu of a decoded arithmetic logic unit (ALU) instruction or a decoded shift instruction.

Particular implementations can include one or more of the following features. The method can further include recognizing an instruction to be processed by a co-processor pipeline and passing the recognized instruction to the co-processor pipeline for decoding and execution. The method can further include decoding the recognized instruction and executing the recognized instruction in the co-processor pipeline.

In general, in another aspect, this specification describes a method of operation for a processor. The method includes storing a program instruction, and decoding the program instruction, including recognizing whether the program instruction is to be processed by a co-processor pipeline. If the program instruction is to be processed by the co-processor pipeline, then the recognized instruction is passed to the co-processor pipeline for decoding and execution. Otherwise a decoded instruction is issued to an execution pipeline of the processor, and a given issued decoded instruction is executed within a given execution pipeline during an execution stage associated with the processor.

In general, in another aspect, this specification describes a processor that includes means for storing an instruction, means for decoding the instruction stored in the buffer, and means for issuing decoded instructions. The processor further includes a first means for executing that includes first means for receiving data for execution of a decoded instruction, and a second means for executing that includes means for separately receiving data with respect to the first means for receiving data.

In general, in another aspect, this specification describes a processor that includes means for storing an instruction, means for decoding the stored instruction, and means for issuing a decoded instruction. The processor further includes executing means that includes means for executing a load or store operation in addition to or in lieu of an arithmetic logic unit (ALU) operation or a shift operation.

In general, in another aspect, this specification describes a pipeline processor architecture having a base architecture that includes means for decoding program instructions and generating one or more decoded instructions, and means for executing the one or more decoded instructions. The means for executing includes one or more execution means. The pipeline processor architecture further includes one or more additional means for decoding and executing instructions. The means for decoding program instructions of the base architecture includes means for recognizing one or more instructions to be processed by a given additional means for decoding and executing instructions and passing the one or more recognized instructions to the given additional means for decoding and executing instructions.

Implementations can include one or more of the following advantages. A highly scalable pipeline processor architecture is provided. In one implementation, the pipeline processor architecture has a base architecture that does not require extensive redesign to accommodate additional instruction execution units (e.g., customer-specific instruction execution units). The pipeline processor architecture can be an ARM (Advanced RISC Machine) pipeline processor architecture. The pipeline processor architecture can support one or more of the following features—dual pipelining, out-of-order execution, variable stage execution, and branch prediction.

In one implementation, a pipeline processor architecture having a dual-issue superscalar design is provided. In one implementation, the superscalar design is implemented with only about a 60% increase in silicon gate count in the core unit, or base architecture, as compared to a conventional single issue device. Cache units associated with the superscalar design are substantially identical to those in a conventional single issue device. The superscalar design can be scaled down to a single issue device simply by removing a second data path that permits a smaller silicon area for the processor architecture. The scaled down single issue device can retain one or more features of the superscalar design including, for example, variable stage execution and branch prediction.

In one implementation, a pipeline processor architecture is provided that can have 6-9 stages to achieve a balance between maximum operating speeds and power dissipation. For example, in a typical 90 nm CMOS process, the pipeline processor architecture can achieve an operating frequency up to 1 GHz with low power. In other implementations, a pipeline processor architecture is provided that can have any number of stages depending upon the particulars or constraints of a given application. The pipeline processor can also include a level-2 (L2) unified cache for high performance applications. The pipeline processor architecture can also include one or more execution units (e.g., arithmetic logic units (ALUs)) that can execute multiple instructions. For example, in one implementation an ALU is provided that can execute both load instructions and store instructions, in addition to ALU instructions.

Additionally, operands (or data) can be separately stored in registers between pipeline stages of the pipeline processor architecture. For example, in one implementation, data from a register file is separately provided to an ALU and a multiply and accumulate (MAC) unit. If a MAC instruction is the only instruction that needs to be executed by the processor during a given instruction cycle, then only the data provided to the MAC unit (and data stored in registers between pipeline stages of the MAC unit) is changed, while the data provided to the ALU remains unchanged. Such operation reduces power consumption within a pipeline processor architecture by eliminating unnecessary toggling of logic gates and latches within execution units.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
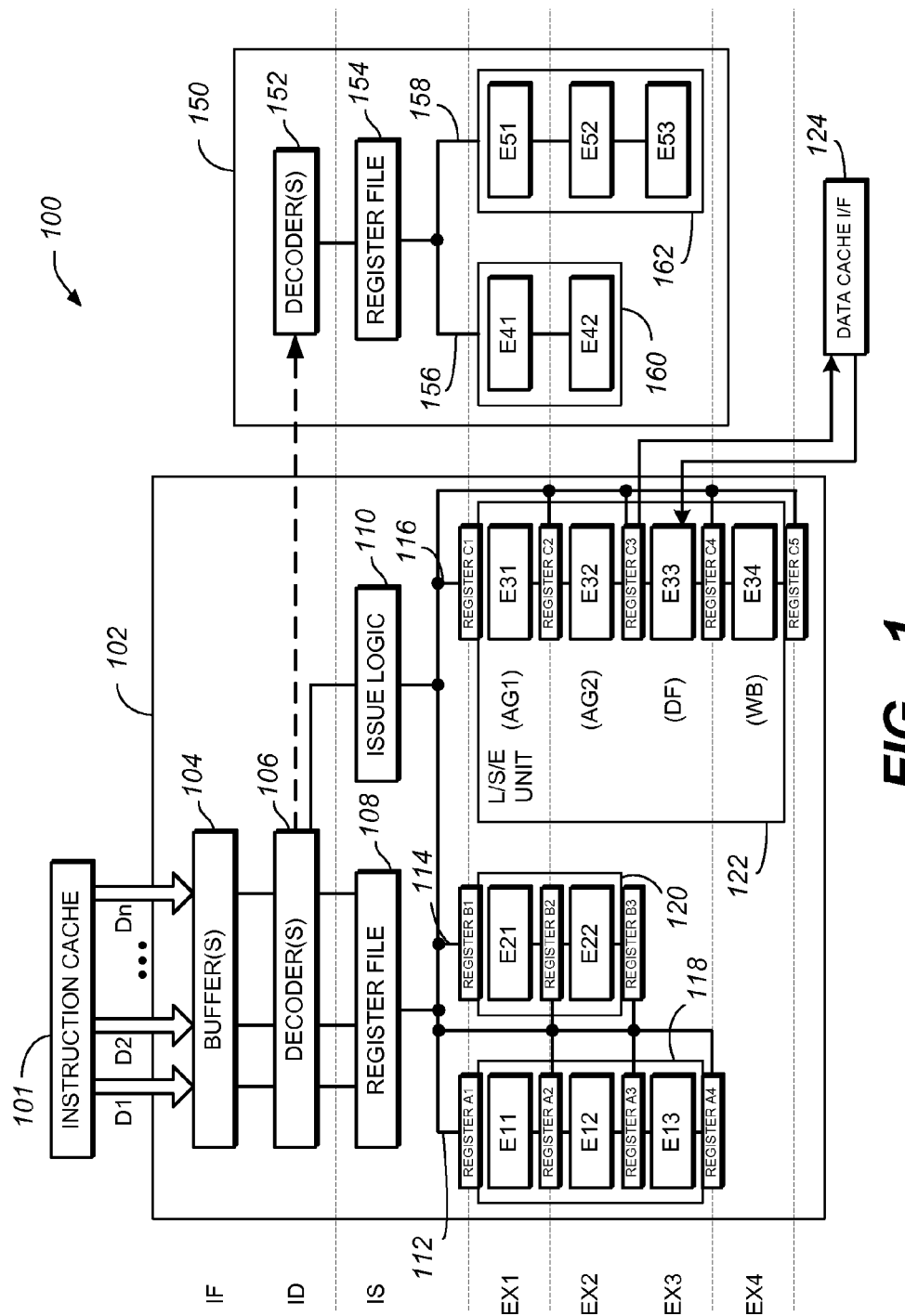
FIG. 1 is a block diagram of a pipeline processor architecture.

FIG. 1 is a block diagram of a pipeline processor architecture 100 that enables execution of one or more program instructions (per instruction cycle) received through one or more data paths D1, D2, Dn. A minimal pipeline processor design (e.g., a non-superscalar, single issue design) includes only a single data path, e.g., only data path D1. In one implementation, pipeline processor architecture 100 includes (7) stages. The (7) stages include an instruction fetch stage (IF), an instruction decode stage (ID), an instruction issue stage (IS), and execution stages (EX1), (EX2), (EX3), and (EX4). Pipeline processor architecture 100, however, can include a different number of stages.

In one implementation, pipeline processor architecture 100 includes a base architecture 102 that contains one or more buffers 104, one or more decoders 106, a register file 108, and issue logic 110.

Base architecture 102 further includes (3) pipelines 112-116. Pipeline 112 includes an execution unit 118, pipeline 114 includes an execution unit 120, and pipeline 116 includes a composite load/store execution unit 122. Though (3) pipelines 112-116 are illustrated in FIG. 1 by way of example, base architecture 102 can include a different number of pipelines and execution units.

Buffer(s) 104 stores program instructions received through the one or more data paths D1, D2, Dn. In one implementation, buffer(s) 104 receives the program instructions from an instruction cache 101. Decoder(s) 106 decodes the program instructions and generates decoded instructions to be executed by any one of execution units 118-122. In one implementation, the decoded instructions are fixed length micro-op instructions. Register file 108 stores operands to be used by execution units 118-122.

Issue logic 110 is operable to determine whether more than one decoded instruction can be executed simultaneously—i.e., within the same instruction cycle. If more than one decoded instruction can be executed, then issue logic 110 issues the decoded instructions to corresponding execution units simultaneously. For example, if decoder(s) 106 decodes instructions for both execution units 118, 120, issue logic 110 determines whether execution units 118, 120 are available, and also whether operands associated with the two decoded instructions are available. In one implementation, the operands are available either in register file 108, a re-order buffer (not shown), or through a bypass (not shown) from an execution unit. The re-order buffer and bypass are discussed in greater detail below in association with FIG. 3. If execution units 118, 120 and the operands are available, then issue logic 110 will issue the two instructions simultaneously to execution units 118, 120. In one implementation, issue logic 110 issues instructions (to be executed) in order—i.e., in strict program order. Other ordering is possible.

Execution units (or functional units) 118, 120 can be implemented to execute any conventional type of operation. Types of operations include ALU (arithmetic logic unit) operations, shift operations, digital signal processing (DSP) operations, and so on. Execution units 118, 120 can include logic gates (not shown), including AND gates, OR gates, XOR gates, and so on. Execution units 118, 120 can also include multiplexers (not shown) and latches, or buffers, (not shown) to facilitate execution in an execution unit. Though execution unit 118 is illustrated as having (3) pipeline stages E11, E12, E13 and execution unit 120 is shown as having (2) pipeline stages E21, E22, these execution units can have a different number of pipeline stages and/or a same number of pipeline stages dependent upon a complexity of operation to be executed by the respective execution units.

Composite load/store execution unit 122 is operable to execute both load instructions and store instructions, in addition to or in lieu of one or more other types of instructions discussed above. In one implementation, as discussed in greater detail below, composite load/store execution unit 122 is operable to execute shift instructions and ALU instructions, in addition to load and store instructions. In one implementation, composite load/store execution unit 122 includes (4) stages—(AG1) address generation 1, (AG2) address generation 2, (DF) data fetch, and (WB) write back—to facilitate load and store instructions. Composite load/store execution unit 122 can contain a different number of stages.

With respect to a load instruction, in one implementation, composite load/store execution unit 122 generates a memory address—e.g., a cache memory address—(during one or both of address generation stages (AG1), (AG2)) from which data will be read. During the data fetch (DF) stage, composite load/store execution unit 122 retrieves the data through an interface (e.g., data cache interface (I/F) 124). In one implementation, data cache I/F 124 is an interface to a level-2 (L2) unified cache (not shown). The data retrieved through the interface (e.g., data cache I/F 124) can be written to a re-order buffer (not shown) or bypassed to an execution unit as needed during the write back (WB) stage.

With respect to a store instruction, in one implementation, composite load/store execution unit 122 generates a memory address (during one or both of address generation stages (AG1), (AG2) to which data will be written or stored. The generated memory address can be a memory address of a data cache (not shown) or a bus (not shown).

In one implementation, there is a tag ram and a data ram associated with the data cache. In one implementation, the tag ram and the data ram are used for mapping addresses within the data cache. With respect to a load instruction, both the TAG ram and the data ram are accessed at the same time during address generation stage AG1 or AG2. With respect to a store instruction, only the tag ram needs to be accessed during address generation stage AG1 or AG2. The data fetch (DF) stage can be used to register (e.g., for timing purposes) both data and tag information. In one implementation, during the write back (WB) stage, cache hits and misses occurs. With respect to a load instruction, if a cache hit occurs then nothing further needs to be done. If a cache miss occurs, then a bus access occurs. With respect to a store instruction, if a cache hit occurs, then data can be written into the cache during the write back (WB) stage. If a cache miss occurs, then data can be written to a write buffer or to the bus. An instruction cache can be accessed in a similar manner as a data cache.

Further execution units can be added to pipeline processor architecture 100 without a substantial redesign to base architecture 102. For example, shown in FIG. 1, pipeline processor architecture 100 can optionally support an additional co-processor pipeline—e.g., co-processor pipeline 150 shown in FIG. 1. In one implementation, co-processor pipeline 150 includes one or more decoders 152, a register file 154 and pipelines 156, 158. Though co-processor pipeline 150 is shown having (2) pipelines (e.g., to support dual issue), co-processor pipeline can have a different number of pipelines. Co-processor pipeline 150 can further include an associated issue logic (not shown) for determining whether decoded instructions can be issued simultaneously within co-processor pipeline 150. Pipelines 156, 158 include execution units 160, 162, respectively.

Execution units 160, 162 can each perform a similar function as any one of execution units 118-122 or a different function. Decoder(s) 106 can be programmed to recognize and pass any instructions that are not intended for an execution unit within base architecture 102 (e.g., execution units 118-122) to decoder(s) 152 for decoding within co-processor pipeline 150. As a result, pipeline processor 100 becomes extensible—i.e., additional co-processor pipelines that can handle instructions not intended for an execution unit within base architecture 102 can be added to pipeline processor 100. Execution units 160, 162 can further include registers (not shown) before and after each execution-stage (e.g., execution stages E41, E42, E51, E52, E53). The registers can permit operands to be separately provided to each execution unit 160, 162 (or execution stage within the execution units). Additional co-processor pipelines (not shown) can be supported (i.e., by being added to base architecture 102) in a like manner.

Pipeline processor architecture 100 can also include one or more registers (or buffers) located before and after each pipeline stage of each execution unit. More specifically, as shown in FIG. 1, execution unit 118 includes registers A1-A4, execution unit 120 includes registers B1-B3, and composite load/store execution unit 122 includes registers C1-C5. In one implementation, operands from register file 108 are separately provided to each register A1, B1, C1. In addition, operands can be separately provided to each execution unit 118-120 (or stage within an execution unit) on a need-only basis using registers A1-A5, B1-B3, C1-C5, unlike a conventional processor architecture in which operands may be provided to all execution units regardless of need. For example, if only a load instruction is to be executed within a given instruction cycle, data associated with the load instruction can be provided to register C1. Registers associated with the other execution units (i.e., registers A1-A5, registers B1-B3) can remain unchanged. Such operation reduces power consumption within a pipeline processor architecture by eliminating unnecessary toggling of logic gates and latches within execution units that are not utilized during a given instruction cycle.

In one implementation, data can also be bypassed from one register to another as needed. For example, if pipeline stage E32 (associated with composite load/store execution unit 122) needs the results of an instruction executed by pipeline stage E12 (associated with execution unit 118), then data from register A2 can be bypassed to register C2. Such operation permits instructions to be issued even when an operand is not available from register file 108.

Figure 2:
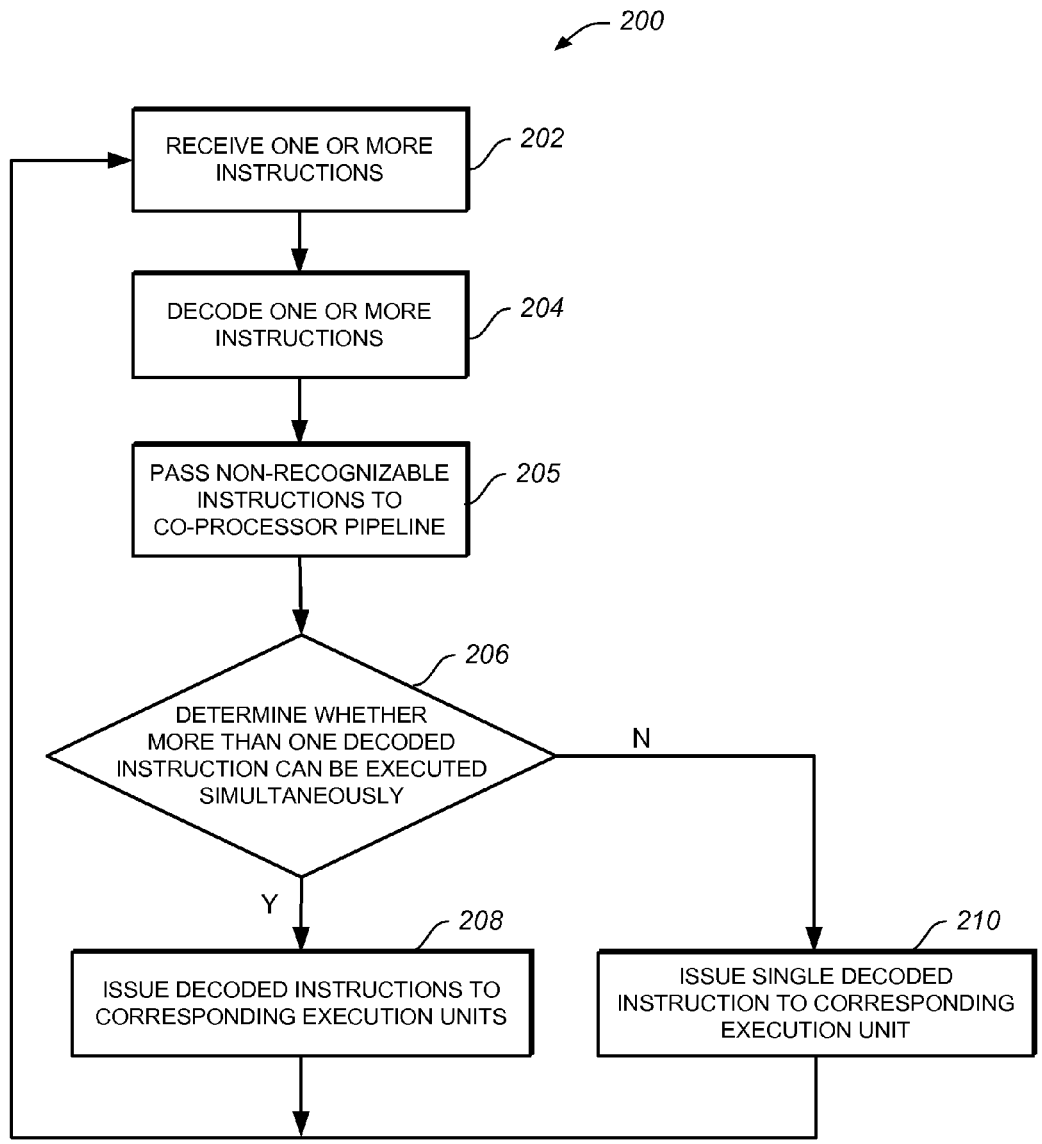
FIG. 2 is method of operation of a pipeline processor designed in accordance with the pipeline processor architecture of FIG. 1.

FIG. 2 shows a method 200 for processing program instructions within a pipeline processor (e.g., built in accordance with pipeline processor architecture 100). Referring now to FIGS. 1 and 2, one or more instructions are received (step 202). In one implementation, the one or more instructions are received from an instruction cache (e.g., instruction cache 101) during an instruction fetch stage by one or more buffers (e.g., buffer(s) 104).

The one or more instructions are decoded (step 204). The one or more instructions can be decoded through one or more corresponding decoders (e.g., decoder(s) 106). If a decoder is unable to decode an instruction, then the decoder passes the instruction to one or more decoders of any additional co-processor pipelines (e.g., co-processor pipeline 150) that may be attached to the pipeline processor base architecture (step 205).

A determination is made (e.g., through issue logic 110) whether more than one decoded instruction can be executed simultaneously (step 206). If more than one decoded instruction can be executed simultaneously, then a plurality of decoded instructions are issued to corresponding execution units (e.g., execution units 118-122) (step 208). In one implementation, issue logic 110 determines whether more than one decoded instruction can issue simultaneously based on an availability of execution units and operands corresponding to the decoded instructions. If more than one decoded instruction cannot be executed simultaneously, then a single decoded instruction is issued to a corresponding execution unit (step 210). In one implementation, the decoded instructions are issued separately to registers associated with each execution unit. The decoded instructions can also be simultaneously issued to a re-order buffer. The re-order buffer can maintain an in-order retirement of the instructions. After steps 208, 210, method 200 returns to step 202, discussed above.

Figure 3:
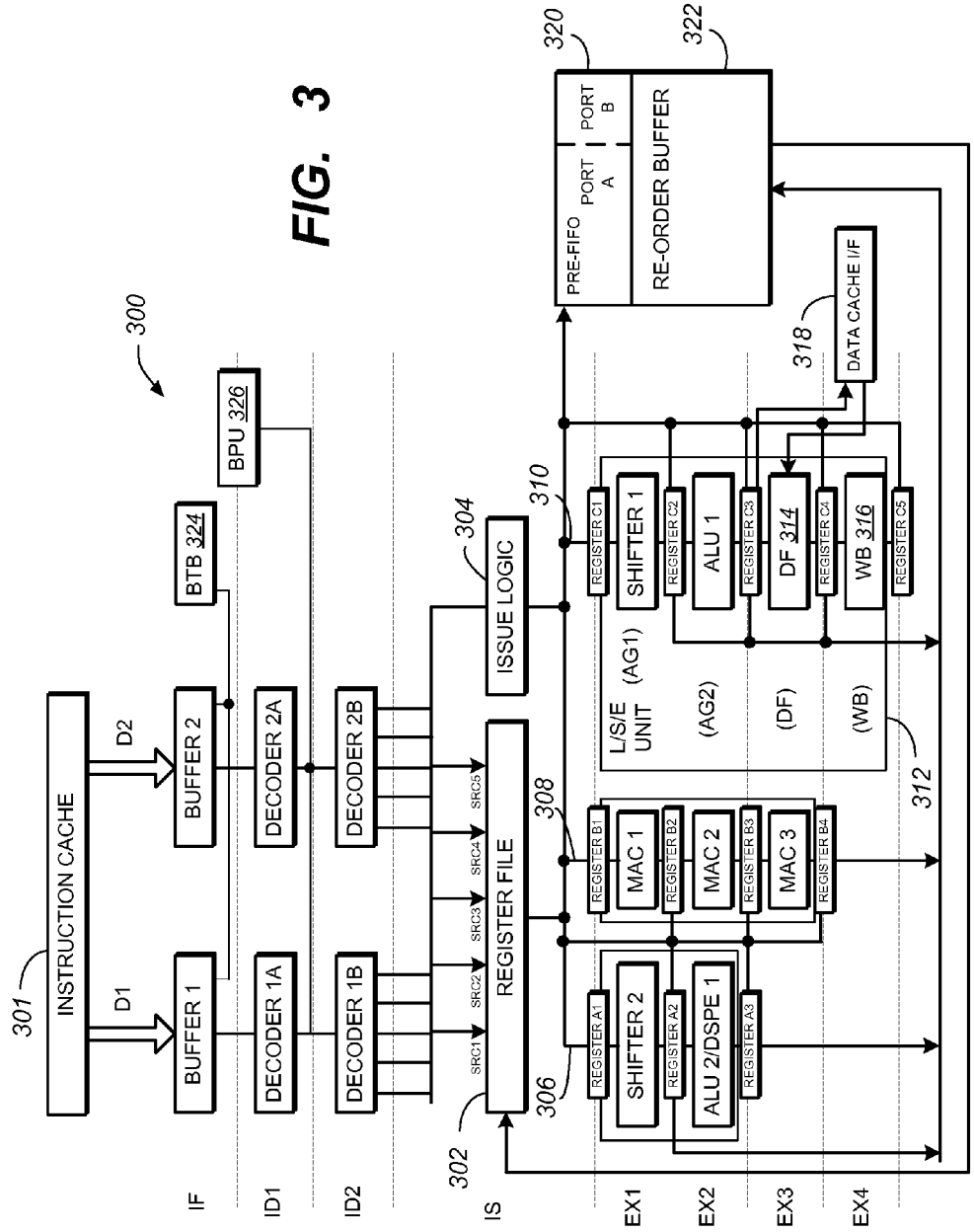
FIG. 3 is a block diagram of a pipeline processor designed in accordance with the pipeline processor architecture of FIG. 1.

FIG. 3 illustrates one implementation of a pipeline processor 300 configured in accordance with pipeline processor architecture 100 of FIG. 1. As shown in FIG. 3, pipeline processor 300 includes buffers 1, 2, decoders 1A, 1B, 2A, 2B, a register file 302, issue logic 304, a pre-fifo 320, a re-order buffer 322, a branch target buffer (BTB) 324, and a branch prediction unit (BPU) 326. Pipeline processor 300 further includes (3) pipelines 306-310.

Within pipeline processor 300, more than one instruction can issue simultaneously to execution units associated with pipelines 306-310. A first data path D1 is provided through buffer 1, decoder 1A, and decoder 1B, and a second data path D2 is provided through buffer 2, decoder 2A, and decoder 2B. In one implementation, during an instruction fetch (IF) stage, buffers 1, 2 each receive program instructions from an instruction cache 301. Also during the IF stage, the address of any instruction assumed to be a conditional branch instruction is passed to branch target buffer 324 for lookup. In one implementation, branch target buffer 324 predicts whether a conditional branch should be taken based on past conditional branches. An address location of the predicted path can be stored in branch target buffer 324. If the address of the instruction hits within branch target buffer 324, then the conditional branch is taken.

During the first instruction decode stage (ID1), instructions within buffers 1, 2 are respectively mini-decoded to determine whether the two instructions can be issued simultaneously (e.g., through issue logic 304), and if so, how to arrange a source index (e.g., source indexes src1-src5) to register file 302. Also during the ID1 stage, in one implementation, a second stage branch prediction is implemented by branch prediction unit 326. In one implementation, branch prediction unit 326 determines whether a conditional branch should be taken if the instruction did not hit within branch target buffer 326. Also, logic (not shown) determines whether the instruction that hit within branch target buffer 324 was a conditional branch and that a target address is matched as well, if so, then no change occurs to instruction flow, otherwise the branch target within branch target buffer 324 is cancelled and a flush is issued to fetch a correct next instruction.

During the second decode stage (ID2), instructions from buffers 1, 2 are further decoded to determine how a source index of register file 302 (e.g., source indexes src1-src5) are to be switched so that operands within register file 302 can be properly aligned with an execution unit upon execution of a given instruction.

The decoded instructions are sent to pre-fifo 320. In one implementation, pre-fifo 320 includes two ports: port A and port B. Port A receives decoded instructions from data path D1 and port B receives decoded instructions from data path D2. In one implementation, the decoded instructions are sent to pre-fifo 320 to preserve an accurate timing of instruction flow. In one implementation, after (1) instruction cycle, the decoded instructions are sent from pre-fifo 320 to re-order buffer 322.

During the instruction issue (IS) stage, issued instructions are sent to re-order buffer 322. Re-order buffer 322 stores the results of executed instructions until the executed instructions are ready for retirement, e.g., into register file 302. In one implementation, re-order buffer 322 is a circular buffer containing (8) entries. Re-order buffer 322 can contain a different number of entries. In one implementation, results of a load instruction are first written to re-order buffer 322, and then re-order buffer 322 updates register file 302. In one implementation, with respect to a other instructions (e.g., a store instruction, ALU instruction, MAC instruction, and so on), if during a given instruction cycle, an instruction is at the bottom of an entry of re-order buffer 322 and an execution unit completes the instruction, results of the executed instruction are written directly to register file 302 without having to first be written to re-order buffer 322.

In one implementation, issue logic 304 issues instructions to the execution units within pipeline processor 300 based on execution unit availability and operand availability. Issue logic 304 can issue instructions from re-order buffer 322 even when an operand is unavailable from register file 302. In such a case, the needed operand can be bypassed to a given execution unit from another execution unit having the operand, or if the needed operand is within re-order buffer 322, then the operand can be bypassed directly to the execution unit from re-order buffer 322. In one implementation, data can be bypassed from between any execution pipeline stage.

Pipeline 306 includes a shifter (i.e., shifter 2), an ALU (i.e., ALU 2), and a digital signal processing element (i.e., DSPE 1), and is operable to execute shift, ALU, and digital signal processing (DSP) instructions. Pipeline 308 includes multiply and accumulate (MAC) units MAC 1, MAC 2, and MAC 3, and is operable to execute a (3)-stage multiply and accumulate operation.

Pipeline 310 includes a composite load/store execution unit 312. In one implementation, composite load/store execution unit 312 includes shifter 1, ALU 1, data fetch (DF) circuitry 314, and write back (WB) circuitry 316. In this implementation, composite load/store execution unit 312 is operable to execute shift, ALU, load, and store instructions. Shifter 1 is operable to execute address shifts and logic shifts. ALU 1 is operable to combine two addresses together and execute conventional ALU instructions. After each execution stage, data can be retired to re-order buffer 322 depending upon the type of instruction executed. For example, data can be retired to re-order buffer 322 from register C2 after a logic shift operation by shifter 1.

With respect to a load instruction, data fetch (DF) circuitry 314 retrieves data through a data cache interface (I/F) 318. If the data is not available from an associated cache (not shown), then the data can be retrieved from another memory (not shown)—e.g., RAM (random access memory). With respect to a store operation, write back (WB) circuitry 316 is operable to write data back to re-order buffer 322, register file 302, cache (not shown), or other memory (not shown).

Figure 4:
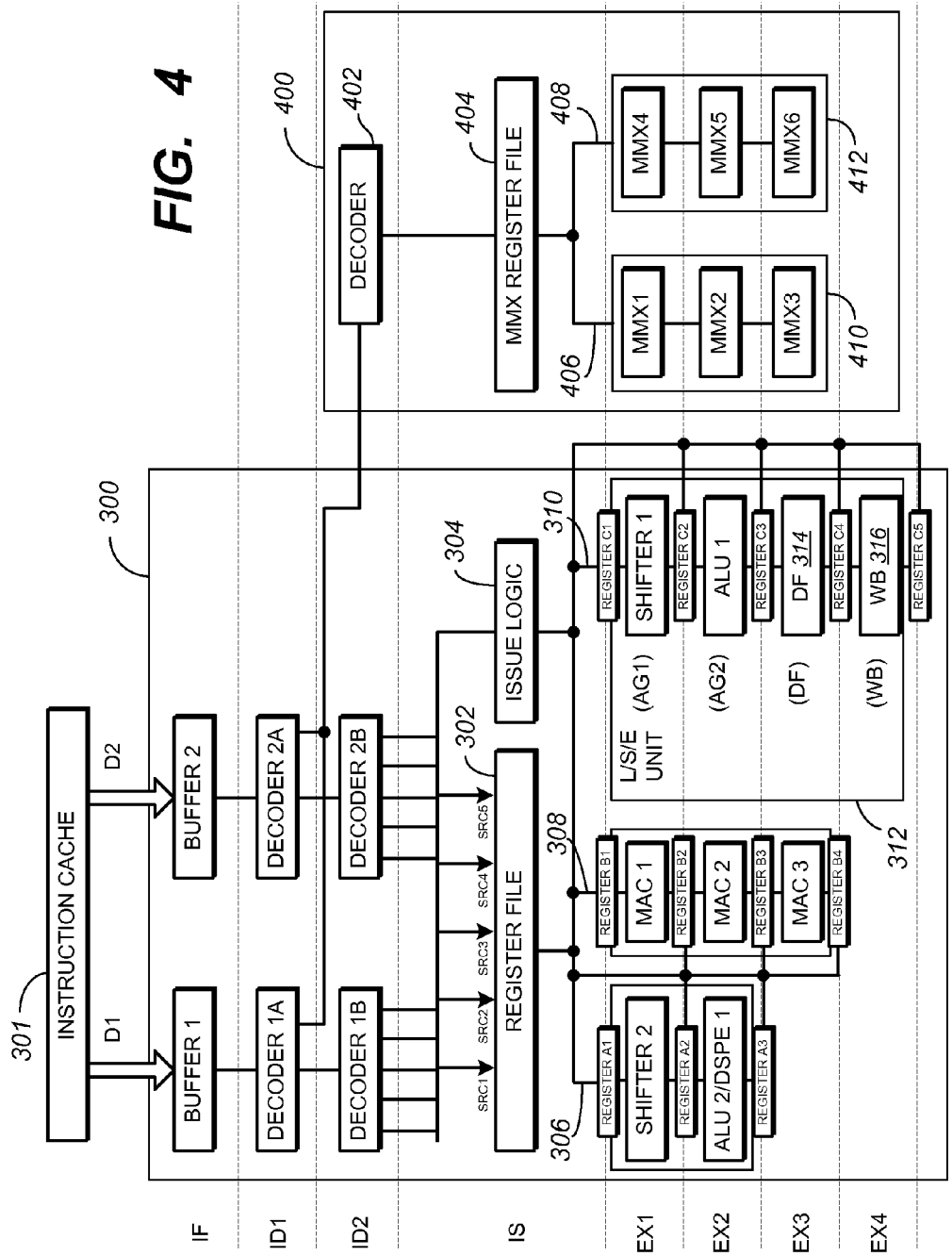
FIG. 4 is a block diagram of the pipeline processor of FIG. 3 including additional execution units.

FIG. 4 illustrates pipeline processor 300 (shown in FIG. 3) along with an additional co-processor pipeline—i.e., MMX pipeline 400. MMX pipeline 400 includes a decoder 402, a MMX register file 404, and two pipelines 406, 408. Pipeline 406 includes a (3)-stage MMX execution unit 410 (MMX1-3), and pipeline 408 includes a (3)-stage MMX execution unit 412 (MMX4-6). Registers (not shown) can be present before and after each of the MMX execution stages. MMX pipeline 400 is operable to execute multi-media extension instructions. In one implementation, instructions flowing through data paths D1, D2 that are intended for MMX pipeline 400 are sent to decoder 402 for decoding. In one implementation, decoders within pipeline processor 300 (e.g., decoders 1A, 2A) are pre-programmed to send instructions intended for MMX pipeline 400 to decoder 402. Other types of co-processor pipelines can also be supported (i.e., added to pipeline processor 300). Other types of co-processor pipelines include co-processor pipelines that can execute vector instructions, floating point instructions, and so on.

A processor built in accordance with pipeline processor architecture 100 of FIG. 1 can be used in a wide range of applications. For example, such a pipeline processor can be used in data storage systems, wireless applications, and other computer systems.

A number of implementations have been described. Nevertheless, it will be understood that various modifications may be made without departing from the spirit and scope of the invention. For example, instructions can be retired at an earlier stage other than as described above. Also, issue logic (e.g., issue logic 304) can issue instructions (to be executed) out of strict program order through use of one or more reservation tables. Register file 302 can include additional read/write ports. Accordingly, other implementations are within the scope of the following claims.

What is claimed is:

1. A processing device comprising:
a buffer to store one or more instructions;
a decoder configured to decode the one or more instructions and generate one or more decoded instructions;
a processor register file to store one or more operands; and
a plurality of execution units, each of the plurality of execution units having:
a plurality of execution stages configured to execute the one or more decoded instructions using the one or more operands, and
a plurality of registers to latch data between the plurality of execution stages, the plurality of registers positioned between the plurality of execution stages to latch data between the plurality of execution stages, wherein a register of the plurality of registers positioned between a pair of execution stages of the plurality of execution stages is configured to provide data directly to a preceding register of the plurality of registers positioned between a different pair of execution stages of the plurality of execution stages.

2. The processing device of claim 1, wherein:
the plurality of execution units include a first set of execution units and a second set of execution units different from the first set of execution units; and
the plurality of registers include a first set of registers associated with the first set of execution units and a second set of registers associated with the second set of execution units, the second set of registers different from the first set of registers.

3. The processing device of claim 2, further comprising issue logic to issue the one or more operands separately to the first set of registers and the second set of registers on a need-only basis.

4. The processing device of claim 2, wherein the issue logic issues the one or more operands to the first set of registers but not the second set of registers in a given instruction cycle.

5. The processing device of claim 2, wherein data in one of the first set of registers bypasses remaining ones of the first set of registers to one of the second set of registers.

6. The processing device of claim 2, wherein:
the first set of execution units includes a first execution stage and the second set of execution units includes a second execution stage; and
data associated with the first execution stage is bypassed to the second execution stage such that data associated with the first execution stage bypasses other execution stages in the first set of execution units to the second execution stage to allow a decoded instruction to be issued even when an operand associated with the decoded instruction is unavailable from the processor register file.

7. The processing device of claim 1, wherein the decoder identifies a decoded instruction that is to be processed by a co-processor, the processing device further comprising:
- the co-processor having one or more co-processor execution units configured to execute the decoded instruction simultaneously with the one or more decoded instructions to be executed by the plurality of execution units; and
- a plurality of co-processor registers including a first set of co-processor registers and a second set of co-processor registers, the plurality of co-processor registers positioned before and after each co-processor execution unit, wherein the one or more operands are issued separately to the first set of co-processor registers and the second set of co-processor registers.

8. The processing device of claim 1, wherein the one or more decoded instructions include a first decoded instruction and a second decoded instruction, and the plurality of execution units include a first execution unit associated with the first decoded instruction and a second execution unit associated with the second decoded instruction, the processing device further comprising:
- issue logic to determine whether the first decoded instruction and the second decoded instruction are to be executed within a same instruction cycle, and to issue the first decoded instruction to the first execution unit and the second decoded instruction to the second execution unit simultaneously if the first decoded instruction and the second decoded instruction are to be executed within the same instruction cycle.

9. The processing device of claim 1, wherein:
- the one or more decoded instructions include one or more decoded load instructions and one or more decoded store instructions; and
- the plurality of execution units include a composite load/store execution unit to execute the decoded load instructions and the decoded store instructions.

10. The processing device of claim 9, wherein:
- for a decoded load instruction, the composite load/store execution unit generates a memory address from which data is to be read during at least one of a first address generation stage or a second address generation stage, retrieves the data through a data cache interface during a data fetch stage, and writes the retrieved data to a re-order buffer or to an execution unit during a write back stage; and
- for a decoded store instruction, the composite load/store execution unit generates a memory address to which data is to be written or stored during at least one of the first address generation stage or the second address generation stage.

11. The processing device of claim 10, wherein:
- the data is associated with a data cache;
- the composite load/store execution unit includes a tag RAM and a data RAM for mapping addresses within the data cache;
- for the decoded load instruction, the tag RAM and data RAM are accessed simultaneously during at least one of the first address generation stage or the second address generation stage; and
- for the decoded store instruction, only the tag RAM is accessed during at least one of the first address generation stage or the second address generation stage.

12. The processing device of claim 11, wherein:
if a cache miss occurs:
- a bus access to a bus is performed for the decoded load instruction, and
- the data is written to the bus or a write buffer for the decoded store instruction; and if a cache hit occurs:
- the data is written into the data cache during the write back stage for the decoded store instruction.

13. The processing device of claim 1, wherein the buffer is a first buffer that stores one or more first instructions, and the decoder is a first decoder that decodes the one or more first instructions to generate one or more first decoded instructions, the processing device further comprising:
- a second buffer to store one or more second instructions; and
- a second decoder to decode the one or more second instructions and generate one or more second decoded instructions.

14. The processing device of claim 13, further comprising a branch target buffer in communication with the first buffer and the second buffer to:
- receive an address associated with a conditional branch instruction from the first buffer or the second buffer;
- predict whether the conditional branch instruction is to be taken based on previous conditional branches; and
- determine that the conditional branch instruction is to be taken if the address of the conditional branch instruction does not hit within the branch target buffer.

15. The processing device of claim 14, further comprising a branch prediction unit in communication with the first decoder and the second decoder, the branch prediction unit to determine whether the conditional branch instruction is to be taken if the conditional branch instruction does not hit within the branch target buffer.

16. The processing device of claim 13, wherein the first decoder and the second decoder are associated with a first set of decoders, the processing device further comprising:
- a second set of decoders including a first decoder and a second decoder, wherein the first decoder of the first set of decoders and the first decoder of the second set of decoders are associated with a first data path, and the second decoder of the first set of decoders and the second decoder of the second set of decoders are associated with a second data path different from the first data path.

17. The processing device of claim 16, wherein:
- the first decoder of the second set of decoders decodes the one or more first decoded instructions from the first decoder of the first set of decoders to generate a first source index; and
- the second decoder of the second set of decoders decodes the one or more second decoded instructions from the second decoder of the first set of decoders to generate a second source index,
- wherein the decoding by the first decoder and the second decoder of the second set of decoders is performed to determine how the first source index and the second source index are to be switched so that the one or more operands in the register file is properly aligned with an execution unit upon execution of a given decoded instruction.

18. The processing device of claim 16, further comprising a pre-first-in-first-out circuit that includes a first port to receive a first decoded instruction from the first data path and a second port to receive a second decoded instruction different from the first decoded instruction from the second data path.

19. The processing device of claim 18, further comprising a re-order buffer to:
  store at least one of the first decoded instruction and the second decoded instruction to be executed, or results of the first decoded instruction and the second decoded instruction; and
  update the register file with the results of the first decoded instruction and the second decoded instruction,
  wherein if a decoded instruction is at a bottom of an entry of the re-order buffer and which has been executed by an execution unit of the plurality of execution units, a result of the decoded instruction is written directly to the register file without first being written to the re-order buffer.

20. The processing device of claim 18, further comprising issue logic to issue the first decoded instruction and the second decoded instruction to the plurality of execution units or a re-order buffer based on an availability of the plurality of execution units and the one or more operands.

21. The processing device of claim 20, wherein:
  the issue logic issues the first decoded instruction or the second decoded instruction to the re-order buffer even if an operand associated with the first decoded instruction or an operand associated with the second decoded instruction is unavailable in the register file; and
  if the operand associated with the first decoded instruction or the operand associated with the second decoded instruction is available in the re-order buffer, the operand associated with the first decoded instruction or the operand associated with the second decoded instruction is sent directly to an execution unit corresponding to the first decoded instruction or the second decoded instruction to be used in executing the first decoded instruction or the second decoded instruction.

22. The processing device of claim 20, wherein an operand not available in the register file is fetched from one execution unit having the unavailable operand to another execution unit that needs the unavailable operand in order to execute the first decoded instruction or the second decoded instruction.

23. A method comprising:
  receiving one or more instructions;
  decoding the one or more instructions to generate one or more decoded instructions;
  storing one or more operands in a processor register file;
  issuing the one or more decoded instructions to a plurality of execution units to be executed using the one or more operands;
  storing the one or more issued instructions in a plurality of registers associated with a plurality of execution stages of the plurality of execution units, the plurality of registers positioned between the plurality of execution stages to latch data between the plurality of execution stages;
  executing one or more operations based on the one or more issued instructions stored in the plurality of registers and the one or more operands stored in the processor register file; and
  transferring data directly from a register of the plurality of registers positioned between a pair of execution stages of the plurality of execution stages to a preceding register of the plurality of registers positioned between a different pair of execution stages of the plurality of execution stages.

24. The processing device of claim 1, wherein the processor register file is configured to provide the one or more operands directly to each register of the plurality of registers.

25. A processing device comprising:
  a buffer to store one or more instructions;
  a decoder configured to decode the one or more instructions and generate one or more decoded instructions;
  a processor register file to store one or more operands; and
  a plurality of execution units, each of the plurality of execution units having:
    a plurality of execution stages configured to execute the one or more decoded instructions using the one or more operands, and
    a plurality of registers to latch data between the plurality of execution stages,
  wherein a register of a first execution unit of the plurality of execution units is configured to provide data directly to a register of a second execution unit of the plurality of execution units, and the register of the second execution unit is positioned between a pair of execution stages of the plurality of execution stages of the second execution unit.

26. The processing device of claim 25, wherein the register of the first execution unit is positioned between a pair of execution stages of the plurality of execution stages of the first execution unit.

27. The processing device of claim 26, wherein the register of the first execution unit is configured to provide data directly to another register of the first execution unit, the other register positioned between a pair of execution stages of the plurality of execution stages of the first execution unit.

28. The processing device of claim 25, wherein the register of the second execution unit is configured to provide data to the register of the first execution unit.

* * * * *